United States Patent [19]
Andersin et al.

[11] Patent Number: 5,790,875
[45] Date of Patent: Aug. 4, 1998

[54] METHOD FOR LOWERING POWER CONSUMPTION IN A COMPUTING DEVICE

[75] Inventors: Kari Andersin, Espoo; Mika Juhani Antila, Tampere; Mika Pitkanen, Tampere; Jari Toivanen, Tampere, all of Finland

[73] Assignee: Nokia Mobile Phones Limited, Salo, Finland

[21] Appl. No.: 939,961

[22] Filed: Sep. 29, 1997

Related U.S. Application Data

[63] Continuation of Ser. No. 539,112, Oct. 4, 1995.

[30] Foreign Application Priority Data

Oct. 7, 1994 [FI] Finland ................... 944699

[51] Int. Cl.$^6$ ................... G06F 13/10
[52] U.S. Cl. ................... 395/750.03; 364/707
[58] Field of Search ................... 364/707; 395/750.01, 395/750.08

[56] References Cited

U.S. PATENT DOCUMENTS

| | | | |
|---|---|---|---|
| 5,167,024 | 11/1992 | Smith et al. | 395/375 |
| 5,291,542 | 3/1994 | Kivari et al. | 379/58 |
| 5,378,935 | 1/1995 | Korhonen et al. | 327/114 |
| 5,384,721 | 1/1995 | Joto | 364/707 |
| 5,396,443 | 3/1995 | Mese et al. | 364/707 |
| 5,416,435 | 5/1995 | Jokinen et al. | 327/113 |
| 5,430,881 | 7/1995 | Ikeda | 395/750 |
| 5,461,266 | 10/1995 | Koreeda et al. | 307/125 |
| 5,471,621 | 11/1995 | Ohtsuki | 395/750 |
| 5,553,296 | 9/1996 | Forrest et al. | 395/750 |

FOREIGN PATENT DOCUMENTS

0448350 A3  5/1993  European Pat. Off. .

OTHER PUBLICATIONS

Finnish Office Action and English Translation thereof, dated 21 June 1995, Application No. 944699, Nokia Mobile Phones Ltd.

*Primary Examiner*—Jack B. Harvey
*Assistant Examiner*—Paul R. Myers
*Attorney, Agent, or Firm*—Perman & Green, LLP

[57] ABSTRACT

The method relates to minimizing power consumption in a computing device, which executes the requested tasks in a high power mode, in which it has normal processing power and, correspondingly, normal power consumption, and which, after it has executed the requested tasks, is switched to a low power mode, in which it has limited processing power and, correspondingly, a considerably lower power consumption. In the method of the invention, the power consumption of a computing device is decreased by lengthening the time during which the device remains in the low power mode in such a way that the device is not switched to a high power mode immediately when the user starts the input, but the switching is delayed. The switching to the low power mode can be done on the basis of a sign included in the input, after a certain time (set or programmable) has passed since the input began, when a specified time has passed since the input stopped, or when a certain amount of information has been received after the input began. The means for the user input may preferably comprise a touch screen and a pen means.

21 Claims, 3 Drawing Sheets

METHOD FOR LOWERING POWER CONSUMPTION IN A COMPUTING DEVICE

This application is a continuation of copending application Ser. No. 08/539,112 filed on Oct. 4, 1995.

FIELD OF THE INVENTION

This invention relates to lowering power consumption in computing devices, which can be set at a so-called low power mode in addition to a normal mode wherein the power consumption is high. In the low power mode the power consumption is considerably less, but the processing power is also limited.

BACKGROUND OF THE INVENTION

The invention is particularly applied to portable computing devices, in which power is not supplied by a main power supply, but by batteries as either a primary or secondary supply, or, for example, solar cells. The current portable computing devices typically have a display, an input arrangement based on use of a pen type input device in connection with the display, and means for recognizing handwritten input by the user. The so-called PDA computers (PDA, Personal Digital Assistant) or various kinds of computing devices that communicate via a mobile communications network, for example, GSM, are examples of the type of computing devices mentioned above.

In a low power mode, unused parts of a portable computing device are switched off or set at a specific low power state. The low power mode can be implemented, for example, by decreasing the clock frequency of the processor. If the normal clock frequency is, for example, 33 MHz, the low power mode it can be, for example, 1 MHz. On the other hand, if the computing device has a separate input controller that has processor capacity of its own, for example, a so-called micro controller, this separate input controller can be kept active in the low power mode, and the actual processor can be set to a sleep mode. When the user of a pen based computing device is not doing anything with the device, the device can be set at low power mode, in which only the display is refreshed, and the device is ready to receive input entered by using a pen device and the display. The processing power of a computing device is low in the low power mode, and only a few functions can be performed, whereas, in the normal mode, which is referred to as a high power mode in this application, the device has full processing power.

A known method for decreasing the power consumption of a computing device is to set the device at a low power mode to await user input after it has executed the given tasks in the high power mode. When the user begins to enter new input, the computing device immediately switches to the high power mode, and after executing the given tasks returns to the low power mode, and so on.

SUMMARY OF THE INVENTION

The object of the invention is to further decrease the power consumption of a portable computing device by increasing, in comparison with the known method, the time, in which the device remains in the low power mode, In order to achieve this object, the characteristics of the invention's method for minimizing the power consumption of a computing device are those, which have been presented in claim 1. The invention is based on the idea that the operation of a computing device can be arranged in such a way, that it is not necessary for the device to immediately switch to a high power mode when the user starts entering input. Instead, the device can receive some amount of input in the low power mode, and switch to the high power mode, on the basis of some criteria, without any reduction in the operation or total processing power.

In the method according to the invention's a computing device executes the given tasks in the high power mode, in which it has normal processing power and, correspondingly, normal power consumption, and after it has executed the given tasks, it is set at the low power mode, in which it has limited processing power and, correspondingly, considerably lower power consumption than normally. The computing device includes, for execution of the given tasks, the processor means, memory means, display means and corresponding control means, and input means and corresponding control means. The computing device includes means to indicate the beginning of input in the low power mode and the invention's method for minimizing the power consumption of a computing device is characterized in that one or several criteria are set to control the switching of the device to the high power mode after the beginning of input has been indicated, and that after the beginning of input has been indicated, the device is retained in the low power mode while the fulfilling of one or several criteria that have been set is monitored, and that the device is set at the high power mode when one or several criteria that have been set are fulfilled.

A computing device can be further implemented in such a way that it is able to receive and recognize input information in the low power mode, and that the criteria for switching to the high power mode is a sign included in the input after obtaining of which sign the device switches to the high power mode. The sign is primarily a simple one, in order for the device to recognize it without using high processing power. It can be, for example, in a pen based portable computer, a sign that is added to the input information when a certain part of the display is touched with the pen or when a specific simple stroke of the pen is drawn on the display. In a computing device that can receive and recognize speech input, the sign can be a corresponding sign that is added to the input information when a simple spoken sign is uttered.

In a simple implementation of the method of the invention, a time period, which is counted from the beginning of the user input, is set. After the given time has passed since the beginning of the input, the device switches to the high power mode. The time to be set can be programmable.

Another possibility is to use the length of a break in the user input as the criteria. In this case, the idea is that the user has entered the required input and waits for the computing device to switch to the high power mode. The length of the break can also be programmable.

Yet another possible criteria is the amount of information that has been entered after the beginning of the input. This can also be programmable.

A computing device can be implemented in such a way that, from the above-mentioned criteria, several alternative criteria are set or some combination of criteria is used.

BRIEF DESCRIPTION OF THE DRAWINGS

Implementation of the method of the invention in a computing device is described in more detail in the following. References are made to the figures, of which.

DETAILED DESCRIPTION OF THE INVENTION

Figure 1:
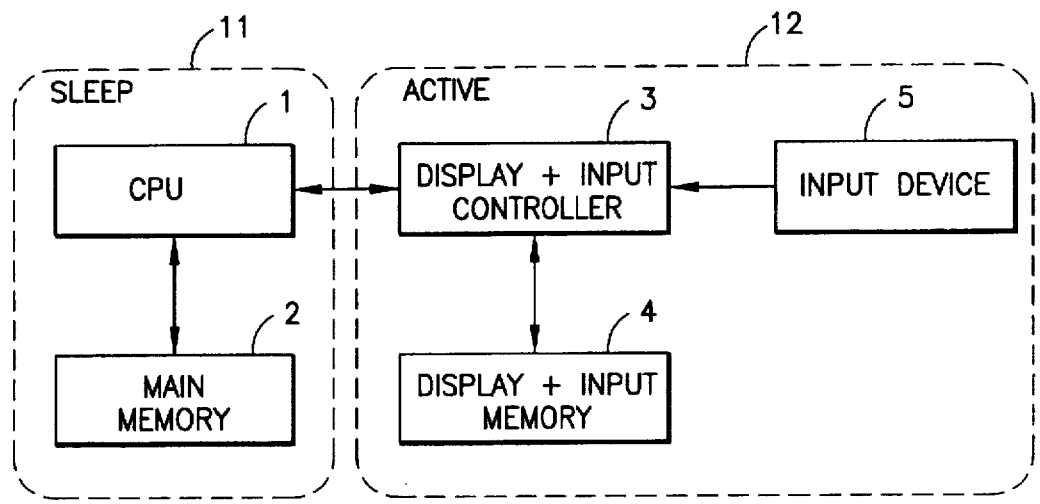
FIG. 1 shows, as a block diagram, an implementation of a computing device, in which the method of the invention can be used.
Figure 2:
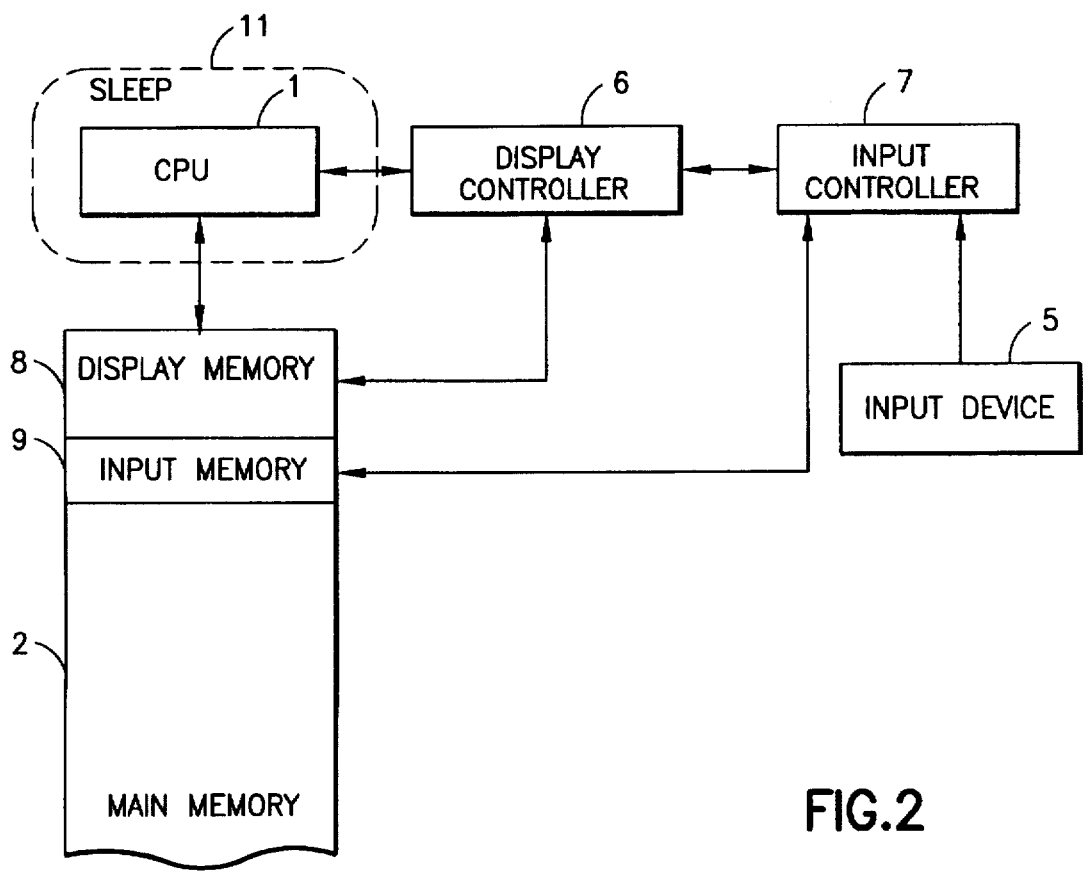
FIG. 2 shows, as a block diagram, another implementation of a computing device, in which the method of the invention can be used.

In FIGS. 1 and 2, only those blocks of the computing device, that are necessary for describing the invention, are presented. CPU 1 is the main processor of the device. It processes the applications used in the device and usually also handles, for example, the speech recognition. A special processor, for example, a digital signal processor, can also be used for this purpose, but this alternative has not been presented in the figures. The main memory 2 contains primarily the programs and application data, but it can also have special memory areas, such as display memory 8 and input memory 9 as presented in FIG. 2. Another possibility is that there is a special memory for the display and input data, as presented in block 4 of FIG. 1. The display memory is used to store the current display data, and the input memory to store the input information. Additionally, computing devices have a display controller, which takes care of refreshing the display and controlling the display and the display memory, and an input controller, which controls the input and the input memory and processes the input information, if necessary. In the implementation in FIG. 1, the display controller and the input controller are presented as one in block 3, and in the implementation in FIG. 2 as separate in blocks 6 and 7. Additionally, in the block diagrams of FIGS. 1 and 2, the input means 5 have been presented. In this description, the input means is primarily a pen type input device, which is used together with the display 10. On the other hand, the input means can include a normal keyboard or, for example, a speech input device in a computing device, which can receive speech input.

In the implementation in FIG. 1, the blocks are divided into two areas, 11 and 12, which are marked with a broken line in the figure. The blocks belonging to area 11, the CPU 1 and the main memory 2, can be switched to a low power mode without interfering with the display. The display/input controller 3 controls the display/input memory 4. The CPU has access to the display memory either via the display/input controller 3 or directly with the help of DMA (not presented in the figure). The display/input controller can be either tightly or loosely coupled. The input means 5 and the display 10 are connected, so that, the user input can also be seen on the display. The display can be an LCD display, and the input can be entered by use of a resistive touch produced by a pen type device. The display/input controller 3 controls the touch input and calculates the locations of the user inputs.

In the implementation in FIG. 2, only the CPU 1, which is marked with a broken line as area 1, can be switched to a lower power mode. Because the display and input memories 8 and 9 are special areas of the main memory, there must be access to the main memory in order to refresh the display and store the required amount of information in the low power mode. The display controller 6 and the input controller 7 can access the corresponding memory areas directly with the help of DMA. Additionally, the input controller 7 may access the display memory area 8 via the display controller 6 or directly with the help of DMA. The display controller and the input controller can be tightly or loosely coupled.

The method of the invention is implemented primarily in connection with the input controller. If the input controller uses the processing capacity of the CPU, the low power mode can be implemented by decreasing the clock frequency, as was described earlier. In this case, the CPU works, but its processing power is considerably less than in a normal high power mode. If the input controller is a separate micro controller, it has full processing power in the low power mode, whereas, the CPU is primarily in a sleep mode. It is clear for a person skilled in the art, that if the criteria for a switch to a high power mode, after the beginning of input has been indicated, is a time period that has passed since the beginning of the input or the length of a break in input, the fulfilling of the criteria can be monitored in a very simple way, which does not necessarily need processing capacity. If the time criteria is implemented as programmable, the easiest solution is to use the processing capacity available in a low power mode. The situation is the same when the criteria are based on the amount of input or especially when the criteria are based on the recognition of an entered sign. When the input controller decides in the low power mode, by using the available processing capacity, that the criteria have been fulfilled, the device can be switched to a high power mode, for example, in the way that the input controller creates an interrupt for the CPU.

Figure 3:
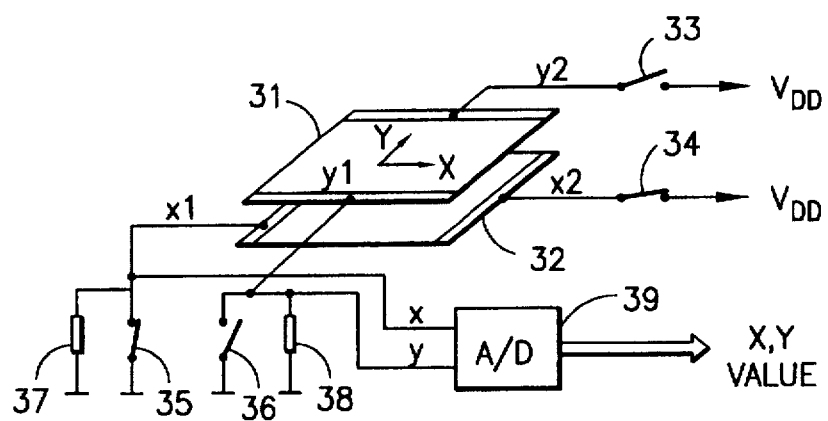
FIG. 3 shows a circuit diagram of a touch screen for receiving input information.

FIG. 3 shows a circuit diagram of a touch screen that can be used for information input in implementing the method according to the invention. The touch screen comprises two resistive films 31 and 32 which have measuring conductors x1, x2, y1 and y2. The measuring conductors are connected to the edges of the films in such a way that a voltage between the measuring conductors y1 and y2 causes a current in the Y-coordinate direction in the film 31. A voltage between the measuring conductors x1 and x2 causes a current in the X-coordinate direction in the resistive film 32.

The two films are separated when the touch screen is not touched. When the touch screen is touched with a pen, the resistive films are connected in the point where the pen touches the screen. The position of the touching point can be measured with the measuring conductors that are attached to the films by measuring the X- and Y-coordinates of the touching point in the following manner. A voltage $V_{DD}$ is connected to the second measuring conductor x2 of the film 32 by closing the switch 34. The first measuring conductor x1 is connected to the zero potential by closing another switch 35. The voltage that is applied to the film 32 causes a current in the direction of the X-coordinate in the film 32. The voltage in a certain point of the film is thus directly proportional to the position in the X-coordinate. The first measuring conductor y1 of the first foil is connected to the input of the analog/digital-converter or A/D-converter 39. When the touch screen is touched with a pen, the first film 31 touches the second film 32, and the voltage in the touching point of the second film 32 is connected to the first film 31 and via the measuring conductor y1 the voltage is further led to the input of the A/D-converter. The output value of the A/D-converter is thus directly proportional to the X-coordinate position of the touching point. When the X-coordinate is measured, switches 33 and 36 are open.

Correspondingly the Y-coordinate position of the touching point is measured by setting the switches 34 and 35 open and setting the switches 33 and 36 closed. The voltage $V_{DD}$ then causes a current in the direction of the Y-coordinate in the foil 31. The voltage in the touching point is connected to the second film 32, and is measured with the A/D-converter 39. The A/D-converter has separate inputs for x and y-signals. By controlling the switches 33, 34, 35 and 36 it is possible to measure X- and Y-coordinate values sequentially and to measure the changes of the position as the pen moves on the surface of the touch screen.

Resistors 37 and 38 have high resistance value and they are connected from the measuring conductors x1 and y1 to the zero potential. The purpose of the resistor is to connect the film to the zero potential when the switch that is parallel to the resistor is open and when the touch screen is not touched. This way the input of the A/D-converter is in the zero potential when the film is not touched, and the input of the A/D-converter is in the voltage that corresponds to the coordinate of the touching point when the touch screen is touched with a pen. If the touch surface of the touch screen is slightly smaller than the area of the film, then even touching the edges of the touch screen gives a non-zero voltage to the A/D-converter. Then by measuring the voltage of the film it is possible to monitor whether the touch screen is touched or not. This monitoring can be made by measuring one of the two coordinate signals. In the idle state this monitoring can be made from one signal and when a touch is detected, measuring of both touch point coordinates can be started. The signal of the first touch can further be used for controlling the computing device to the high power mode.

Figure 4:
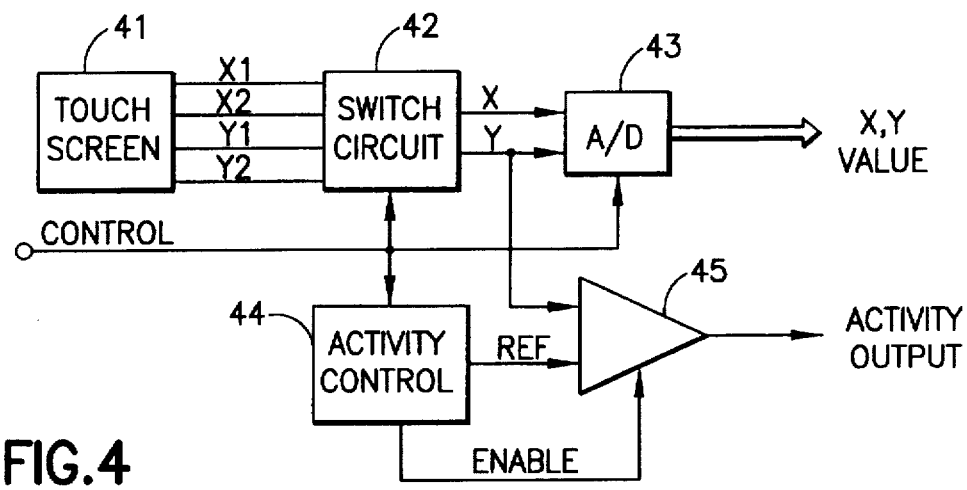
FIG. 4 shows an analog implementation of a touch screen for a computing device, in which the method of the invention can be used.

FIG. 4 shows an implementation where a touch screen is used for setting the computing device to the high power mode. The measuring conductors x1, x2, y1 and y2 of the touch screen 41 are led to the switch circuit 42, which gives the X- and Y-coordinate signals to the A/D-converter 43. The switch circuit and the A/D-converter are controlled by the processor (not shown in FIG. 4) in such a way that in the active mode of the touch screen the X- and Y-coordinates are measured sequentially. In the idle mode of the touch screen the signals are not measured by the A/D-converter 43 but one of the signals is measured by an analog comparator 45. The comparator 45 compares the signal to a reference signal that is received from an activity control unit 44. When the level of the measured signal exceeds the reference signal level, the activity output of the comparator changes to the active state and thus informs the processor that the touch of the touch screen has been detected. After receiving this information the processor begins to measure the X- and Y-coordinates by controlling the switch circuit and the A/D-converter with a control signal. The control signal is also led to the activity control unit, which disables the output of the comparator with an enable signal when the touch screen is in the active mode.

Figure 5:
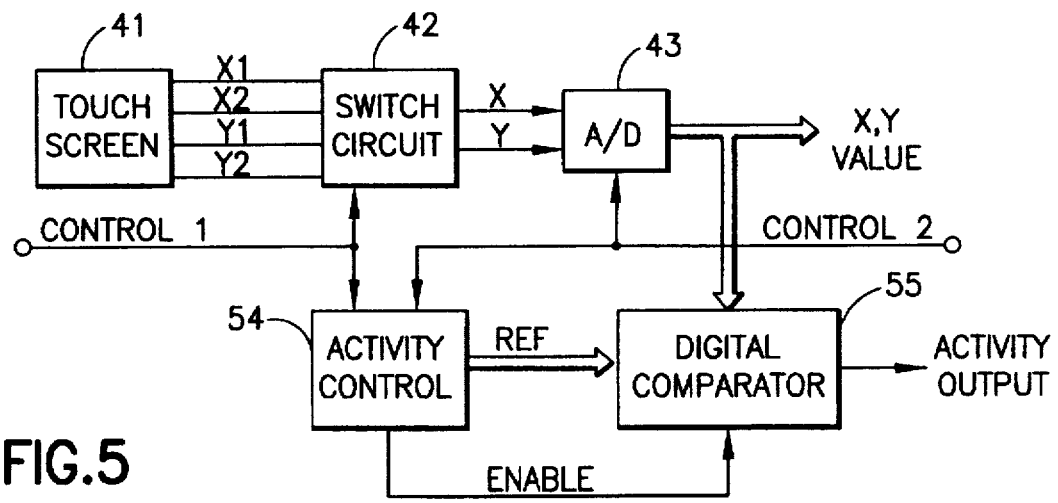
FIG. 5 shows a digital implementation of a touch screen for a computing device, in which the method of the invention can be used.

FIG. 5 shows an implementation which has a similar touch screen 41, switch circuit 42 and A/D-converter 43 as the implementation in FIG. 4, but where a digital comparator 55 is used. In the idle mode of the touch screen the comparator measures the digital output of the A/D-converter 43 and compares it with the digital reference value that is received from the activity control unit 54. When the measured value exceeds the reference value, the activity output signal of the comparator informs the processor that a touch to the touch screen has been detected. After this the processor controls the switch circuit and A/D-converter with control signal 1 and control signal 2 in such a way that it receives X- and Y-coordinate values sequentially from the A/D-converter. In this active mode of the touch screen the activity control unit 54 disables the activity of the comparator 55 until the processor stops reading the coordinate values.

The implementation in FIG. 4 has a benefit that the A/D-converter can be in idle mode when the touch screen is in the idle mode. If a digital comparator is used, as in FIG. 5, the A/D-converter must perform conversions also in the idle state of the touch screen, and this is why the switch circuit 42 and the A/D-converter 43 are controlled with separate control signals. In this implementation with digital comparator energy can be saved by controlling the A/D-converter with a much lower frequency in the idle state of the touch screen than in the active state. The relation between the sample frequencies of the active and idle modes can be 1:10, for example.

Touch screen can be used for setting the computing device to high power mode in two ways: the touch screen may give an indication that the user input has started and the touch screen can be used for entering the sign for setting the computing device to the high power mode. In order to receive input the touch screen normally turns into active mode before the computing device turns into high power mode.

Figure 6:
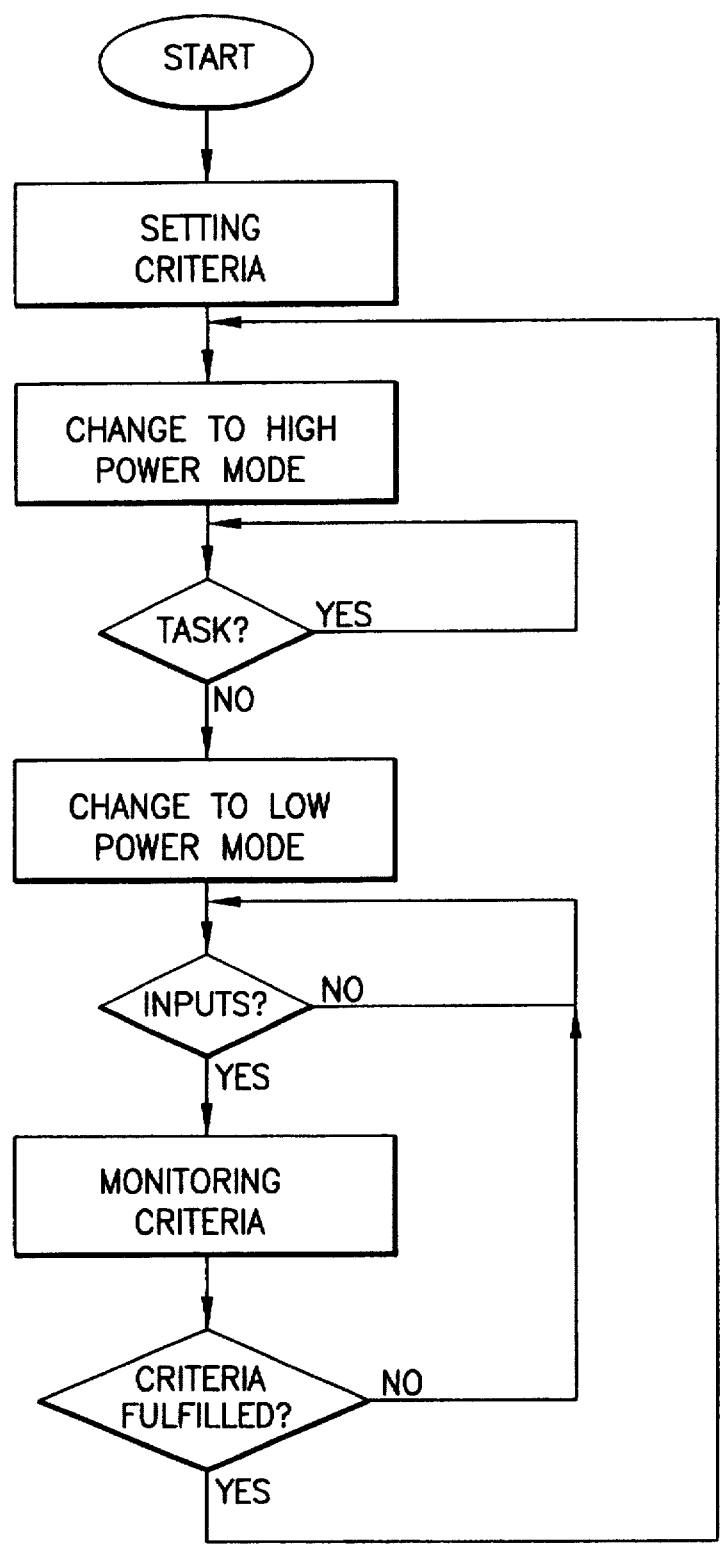
FIG. 6 is a logic flow diagram that illustrates a method of this invention.

FIG. 6 is a logic flow diagram that illustrates a method of this invention.

More particularly, FIG. 6 a logic flow diagram describing the method of the invention. At Step 61 a criteria for transition from the low power mode to the high power mode is defined. The criteria is preferably a simple sign included in the input. The sign can be a touch to the display of a pen based portable computer. At Step 62 the system is set to the high power mode for normal operation. It is determined at Step 63 if there are any tasks that require normal processing power. These tasks are typically applications used in the device. One of the applications requiring normal processing power could be speech recognition. If such a task exists, control passes back to Step 63, and the system stays in the high power mode. If no such tasks exist, control instead passes to Step 64 and the system is set to the low power mode. At Step 65 it is determined if there are any inputs, e.g., key strokes on the keyboard. If there are no such inputs control passes back to Step 65, and the system remains in the low power mode. If there is an input the input is monitored at Step 66 and then compared at Step 67 to the criteria defined in Step 61. If the criteria for high power mode is not fulfilled control passers back to Step 65, and the system remains in the low power mode. If the criteria for high power mode is fulfilled at Step 67 control instead passes to Step 62 to enter the high power mode.

The invention may vary within the scope of the following claims.

We claim:

1. A method for minimizing power consumption in a computing device, which comprises a processor for executing tasks, a memory coupled to the processor, a display and corresponding display controller, and an information input device and corresponding input device controller, the processor being capable of being placed in either one of a reduced power mode of operation or a normal power mode of operation, comprising the steps of:

setting at least one criterion in the computing device for controlling the switching of the processor to the normal power mode of operation;

detecting an occurrence of information input to the input device;

only when the processor is in the reduced power mode of operation, transmitting the inputted information in an unprocessed state from the input device controller to the display and to the memory for storage;

detecting a fulfillment of the at least one criterion based on the information input;

in response to detecting the fulfillment of the at least one criterion, switching the processor from the reduced power mode of operation to the normal power mode of operation; and transmitting the unprocessed input information from the memory to the processor for performing any required processing.

2. A method in accordance with claim 1, wherein the at least one criterion is comprised of a predetermined sign that is included in the input information.

3. A method in accordance with claim 2, wherein the input device is comprised of a pen means which is used in connection with the display, and wherein the predetermined sign included in the input information is produced by touching a predetermined location on the display with the pen means.

4. A method in accordance with claim 2, wherein the input device is comprised of a pen means which is used in connection with the display, and wherein the predetermined sign included in the input information is produced by a specific stroke drawn on the display using the pen means.

5. A method in accordance with claim 2, wherein the input information includes speech input, and wherein the predetermined sign included in the input information is produced by speech.

6. A method in accordance with claim 1, wherein the at least one criterion is comprised of a predetermined amount of time that begins with a time that the input information is first input to the input device.

7. A method in accordance with claim 6, wherein the predetermined amount of time is programmable.

8. A method in accordance with claim 1, wherein the at least one criterion is comprised of a predetermined amount of time that occurs after the information is first input to the input device, and during which no further information is input to the input device.

9. A method in accordance with claim 8, wherein the predetermined amount of time is programmable.

10. A method in accordance with claim 1, wherein the at least one criterion is comprised of a predetermined amount of input information.

11. A method in accordance with claim 10, wherein the predetermined amount of input information is programmable.

12. A method in accordance with claim 1, wherein the input device is comprised of a pen means which is used in connection with the display, and wherein a start of information input is indicated, when the processor is in the reduced power mode of operation, by detecting a touch of the pen means to the display.

13. A method in accordance with claim 12, wherein a first touch of the pen means to the display is monitored and, after the first touch of the pen means to the display is detected, a position of the pen means on the display is monitored.

14. A computing device, comprising:

a processor for executing tasks, the processor being capable of being placed in either one of a reduced power mode of operation or a normal power mode of operation;

a memory coupled to the processor;

a display and corresponding display controller;

an information input device and corresponding input device controller;

means, in said input device controller, for detecting an occurrence of information input to the input device and for transmitting the inputted information in an unprocessed state from the input device controller to the display and to the memory for storage, said means for detecting and transmitting operating only when the processor is in the reduced power mode of operation;

means for detecting, based on the information input, a fulfillment of at least one predetermined criterion, the at least one predetermined criterion being selected for controlling the switching of the processor to the normal power mode of operation; and means, responsive to detecting the fulfillment of the at least one criterion, for switching the processor from the reduced power mode of operation to the normal power mode of operation such that the unprocessed input information is transferred from the memory to the processor for performing any required processing.

15. A computing device in accordance with claim 14, wherein said input device is comprised of a touch screen for providing an output signal that is a function of a location where the touch screen is contacted.

16. A computing device in accordance with claim 15, wherein the output signal is an analog signal, and further comprising an A/D-converter for converting the analog signal into a digital signal.

17. A computing device in accordance with claim 15, and further comprising means for providing a reference signal and a comparator for comparing the reference signal to the output signal, said comparator outputting a comparison signal that is a function of a difference between the reference signal and the output signal.

18. A computing device in accordance with claim 17, wherein the comparator is a digital comparator.

19. A computing device in accordance with claim 17, and further comprising means for measuring a location where the touch screen is touched, said measuring means being activated by the comparison signal output signal from the comparator.

20. A computing device in accordance with claim 17, wherein said switching means is activated by the comparison signal that is output from the comparator.

21. A computing device, comprising:

a processor for executing tasks, the processor being capable of being placed in either one of a reduced power mode of operation or a normal power mode of operation;

an information input device and corresponding input device controller, said information input device comprising a touch sensitive display and corresponding display controller;

a common memory coupled both to the processor and to the input device controller;

means, in said input device controller, for detecting an occurrence of information input to the input device and for transmitting the inputted information in an unprocessed state to the touch sensitive display and to the memory for storage, said means for detecting and transmitting operating only when the processor is in the reduced power mode of operation;

means, coupled to the touch sensitive display, for detecting a fulfillment of at least one predetermined criterion based on the touch screen display being touched; and means, responsive to detecting the fulfillment of the at least one criterion, for switching the processor from the reduced power mode of operation to the normal power mode of operation such that the unprocessed input information is transferred from the memory to the processor for processing.

* * * * *